(12) United States Patent
Ferguson et al.

(10) Patent No.: US 7,277,386 B1
(45) Date of Patent: Oct. 2, 2007

(54) DISTRIBUTION OF LABEL SWITCHED PACKETS

(75) Inventors: Dennis C Ferguson, Palo Alto, CA (US); Nischal Sheth, Sunnyvale, CA (US); Ken Kuwabara, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1079 days.

(21) Appl. No.: 10/293,785

(22) Filed: Nov. 12, 2002

(51) Int. Cl.
*H04J 1/16* (2006.01)
*H04J 3/16* (2006.01)
*H04L 12/66* (2006.01)
*H04L 12/56* (2006.01)
*H04L 12/28* (2006.01)

(52) U.S. Cl. .................. 370/230; 370/235; 370/356; 370/389; 370/392; 370/395.32; 370/395.5; 370/400; 370/466

(58) Field of Classification Search ................ 370/389, 370/392, 395.1, 400, 409, 229
See application file for complete search history.

(56) References Cited

U.S. PATENT DOCUMENTS

| 6,091,725 | A | 7/2000 | Cheriton et al. |
| 6,118,760 | A | 9/2000 | Zaumen et al. |
| 6,243,667 | B1 | 6/2001 | Kerr et al. |
| 6,553,005 | B1 * | 4/2003 | Skirmont et al. ........... 370/285 |
| 6,651,099 | B1 | 11/2003 | Dietz et al. |
| 6,909,713 | B2 | 6/2005 | Magnussen et al. |
| 6,980,550 | B1 | 12/2005 | Yip et al. |
| 2001/0043585 | A1 | 11/2001 | Hummel |
| 2004/0013113 | A1 | 1/2004 | Singh et al. |
| 2004/0258073 | A1 * | 12/2004 | Alexander et al. ....... 370/395.5 |

OTHER PUBLICATIONS

Viswanathan et al. "Evolution of Multiprotocol Label Switching". IEEE. May 1998. pp. 165-173.*
U.S. Appl. No. 10/208,250, entitled "Network Traffic Distribution Across Parallel Paths," filed Jul. 29, 2002, Ross W. Callon.

* cited by examiner

*Primary Examiner*—Melanie Jagannathan
(74) *Attorney, Agent, or Firm*—Shumaker & Sieffert, P.A.

(57) ABSTRACT

Techniques are described for distribution of label switched packets, such as multiprotocol label switched (MPLS) packets, across multiple physical data paths. The techniques may, for example, be used to load balance the label switched packets across an aggregated link having two or more logically associated physical interconnects. A network device, for example, includes an interface card to receive packets associated with a common label switched path (LSP), and a control unit to distribute the packets across multiple paths. The network device may include label data that maps ranges of labels, such as MPLS labels, to types of payloads carried by the label switched packets. In accordance with the label data, the control unit extracts flow information from the label switched packets and distributes the label switched packets across the paths based on the flow information. The control unit may generate hash values from the flow information, the labels, or combinations thereof, to control distribution of the label switched packets.

44 Claims, 8 Drawing Sheets

DISTRIBUTION OF LABEL SWITCHED PACKETS

TECHNICAL FIELD

The invention relates to computer networks and, more particularly, distribution of traffic within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

In some environments, two network devices may be connected by multiple physical interconnects. For example, two network routers may be connected by multiple Ethernet links. Similarly, multiple physical interconnects may couple other devices, e.g., two switches, a switch and a server, two routers, a switch and an end user station, and the like.

The term "link aggregation" refers to a technique by which the multiple physical interconnects are logically associated and treated as a single, aggregated link. In particular, the IEEE 802.3ad Working Group recently developed a Link Aggregation specification. This approach may provide for increased link availability and bandwidth between the two devices. For example, bandwidth can be increased in linear increments, e.g., by adding individual interconnects to increase the bandwidth between the two devices. In addition, the multiple physical interconnects provide a degree of redundancy in that a failure in a single physical interconnect no longer inhibits direct traffic flow between the two devices. With link aggregation, traffic on a failed physical interconnect can be redirected to one of the other physical interconnects in the aggregated link.

In general, link aggregation operates by inserting a layer within the networking stack between the second and third layers. For Ethernet, for example, a new Link Aggregation Layer functions between the Ethernet Media Access Control (MAC) layer, and the higher layer protocols. Each of the underlying Ethernet ports in an aggregated link transmits and receives frames with its own unique MAC address. As frames pass through the Link Aggregation layer, addresses are manipulated so the aggregated ports appear as a single link with one MAC address. This allows link aggregation to be completely transparent to higher layer protocols.

SUMMARY

In general, the invention is directed to techniques for distributing label switched packets, such as multiprotocol label switched (MPLS) packets, associated with a common label switched path (LSP). The techniques may, for example, be used to load balance label switched packets of an LSP across an aggregated link having two or more logically associated physical interconnects. In addition, the techniques may be used to distribute label switched packets of a common LSP across multiple data paths within a network device, such as a router. As used herein, the term path refers to any physical path for communicating data. In this manner, the term encompasses both external physical interconnects between network devices, and internal data paths within an individual network device.

In one embodiment, a method comprises receiving packets associated with a common label switched path (LSP), and distributing the packets across multiple paths.

In another embodiment, a method comprises receiving a label switched packet having a label, and extracting flow information from the packet based on the label. The method further comprises distributing the packet to one of a plurality of paths based on the extracted flow information.

In another embodiment, a method comprises receiving a packet having a plurality of labels in accordance with a label switching protocol, and applying a hash function to the plurality of labels to generate a hash value. The method further comprises distributing the packet to one of a plurality of paths based on the hash value.

In another embodiment, a method comprises receiving a data unit from a network device, determining a type of communication protocol for the data unit, and selecting a label based on the type of communication protocol. The method further comprises pre-pending the selected label to the data unit to form a label switched packet in accordance with a label switching protocol, and forwarding the packet along a label switched path in accordance with the label.

In another embodiment, a network device comprises an interface card to receive packets associated with a common label switched path (LSP), and a control unit to distribute the packets across multiple paths.

In another embodiment, a computer-readable medium comprises instructions that cause a processor to receive packets associated with a common label switched path (LSP), and distribute the packets across multiple paths.

In another embodiment a computer-readable medium comprises label data that associate ranges of labels with types of payloads to control distribution of label switched packets across multiple paths.

The invention may provide one or more advantages. For example, the described techniques may allow a network device, e.g., a router, to actively distribute packets associated with a common LSP across parallel physical data paths.

As one example, the network device may apply the techniques to distribute label switched packets, such as MPLS packets, across the logically associated physical interconnects of an aggregated network link. As another example, the techniques may be used to distribute MPLS traffic across internal data paths within a network device, e.g., across multiple data paths between an input interface card and an output interface card, across internal high-speed switching components, or across multiple forwarding engines within the network device.

By distributing the MPLS packets across multiple data paths load balancing may be achieved, and the techniques may decrease packet latency through the network and the various communication devices. In addition, the techniques allow for the distribution of the MPLS traffic, while maintaining in-sequence delivery of packets of common data flows. In other words, those MPLS packets having common flow characteristics, such as MPLS packets having common source and destination addresses and ports, as well as the same communication protocol, may be distributed to the same physical interconnect in accordance with the techniques.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
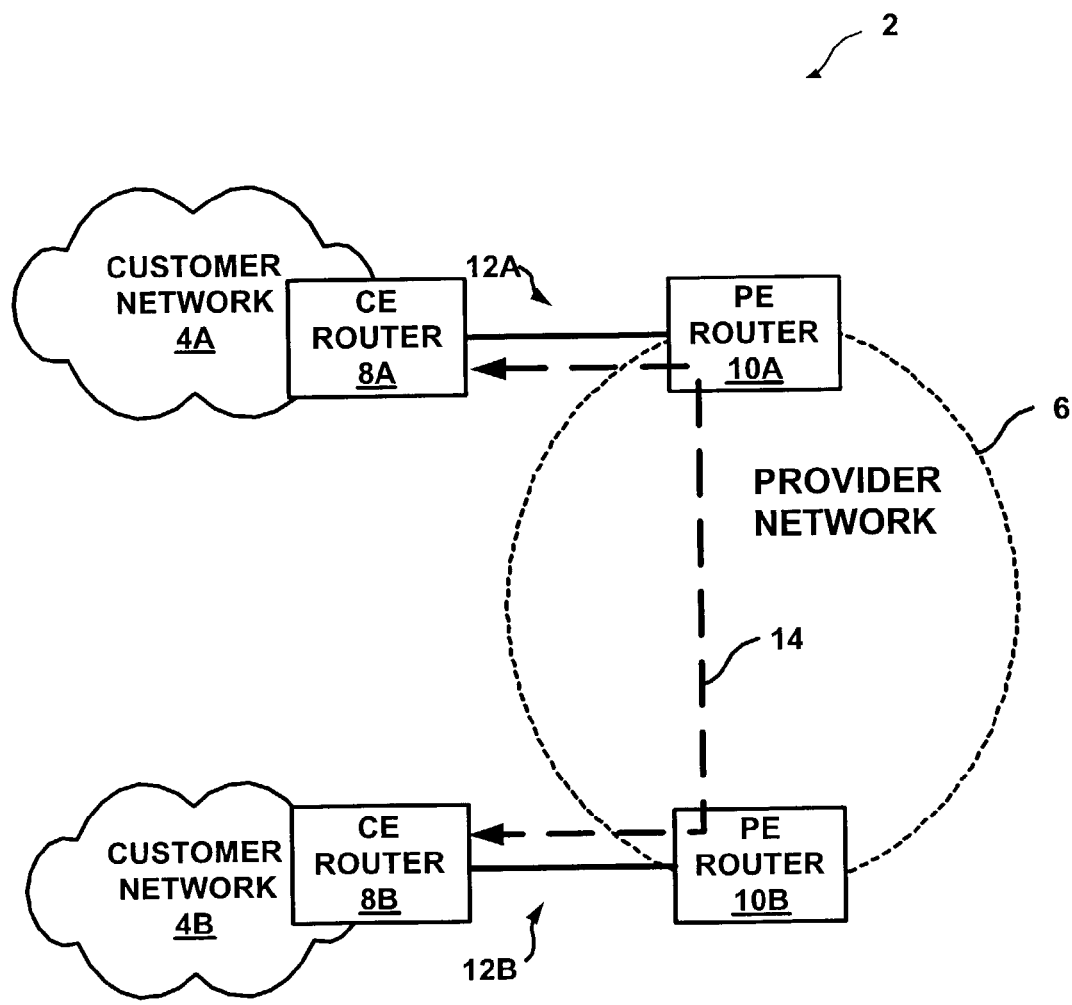
FIG. 1 is a block diagram illustrating an example system in which network devices distribute MPLS packets across parallel data paths in accordance with the principles of the invention.

FIG. 1 is a block diagram illustrating an example system 2 in which customer networks 4A, 4B ("customer networks 4") are communicatively coupled via an intermediate provider network 6. Specifically, customer network 4A includes a customer edge ("CE") router 8A that is connected to a provider edge ("PE") router 10A via an aggregated link 12A. In other words, CE router 8A and PE router 10A communicate via two or more physical interconnects that are logically associated as an aggregated link. For example, CE router 8A and PE router 10A may communicate via two or more Ethernet links, Sonet links, or other physical interconnects. Similarly, customer network 4B includes a CE router 8B that is connected to a PE router 10B via an aggregated link 12B. PE routers 10 communicate network traffic from and to customer networks 4 in accordance with a label switching protocol, such as the Multiprotocol Label Switching (MPLS) protocol, via one or more label switched paths (LSPs) 14. For example, CE router 8A receives network traffic originating from devices within customer network 4A, and pre-pends MPLS labels to the network traffic to form outbound MPLS packets. CE router 8A communicates the outbound MPLS packets to PE router 10A via aggregated link 12A.

PE router 10A receives the MPLS packets, and forwards the MPLS packets to one or more intermediate routers (not shown) within provider network 6 for communication to PE router 10A via one of LSPs 14. PE router 10A may, for example, pre-pend additional MPLS labels to the traffic to form MPLS packets having multiple MPLS labels. In this manner, each MPLS packet traversing provider network 6 via LSPs 14 may be guaranteed to carry two or more MPLS labels.

PE router 10B receives the MPLS packets from provider network 6, and forwards the MPLS packets to CE router 8B via aggregated link 12B. PE router 10B may, for example, remove one or more MPLS labels from each of the inbound packets, and distribute the packets across the physical interconnects that are logically associated to form aggregated link 12B. Network traffic flows from customer network 4B to customer network 4A in similar manner.

In general, the devices of system 2, i.e., CE routers 8, PE routers 10, and intermediate routers (not shown) within provider network 6, utilize MPLS labels within pre-allocated ranges to convey protocol information for the payloads of the MPLS packets. In other words, the devices assign MPLS labels of the pre-allocated ranges to the MPLS packets based on the type of payloads carried by the MPLS packets. The devices may make use of this protocol information to facilitate distribution of the MPLS packets across multiple paths, e.g., multiple physical interconnects of an aggregated link.

For purposes of example, the techniques are described in reference to the MPLS protocol and MPLS packets. However, the techniques may readily be applied to any type of label switching protocol in which each packet carries a switching "label" that is associated with a defined network path, referred to herein as a "label switched path." Accordingly, the techniques are not limited to MPLS, and may me applied to other protocols that make use of switching labels, including but not limited to ATM, Frame Relay, and the like. The term label switched path, as used herein, generally refers to any defined path of switching nodes within a network, and includes MPLS LSPs, ATM virtual circuits, and the like.

Generally, the label typically carries an index into a forwarding table, e.g., a forwarding table maintained by each of CE routers 8 and PE routers 10, which specifies the next hop for the packet. In this manner, these devices do not need to examine the label switched packets and perform next-hop routing tasks. In other words, the label associates the packet with an LSP, and carries the information that determines which path a packet should take. Forwarding decisions can be made based on a field in the packet or cell, i.e., the label, and the incoming interface, without requiring a route lookup.

One difficulty in distributing or otherwise load balancing MPLS packets across multiple physical data paths, e.g., the multiple interconnects of an aggregated link, is that an MPLS label is typically an arbitrary label unrelated to the payload. As a result, conventional mechanisms for distributing network traffic cannot identify packets belonging to a common data flow and, as a result, may distribute packets of a common data flow across separate paths. Consequently, the MPLS packets may arrive at the destination out of order, which can be problematic for the MPLS protocol, which requires in-sequence delivery. Further, the distribution mechanism may not be able to achieve substantial distribution of the traffic among the paths, which may result in congestion on one data path and unused bandwidth on another. This may decrease the efficiency of the network and increase packet latency.

In accordance with the principles of the invention, network devices of system 2 utilize the protocol information conveyed by the pre-allocated ranges of MPLS labels to control the distribution mechanism, thereby leading to improved distribution while ensuring in-sequence delivery of the packets. The devices may, for example, map the ranges of MPLS labels to respective communication protocols associated with the payloads of the MPLS packets, as illustrated in the following table:

TABLE 1

| MPLS LABEL RANGE | PAYLOAD TYPE |
| --- | --- |
| 100000-110000 | TUNNELED ETHERNET |
| 111001-120000 | IPv4 |
| 120001-130000 | IPv6 |
| 130001-140000 | ATM |
| 140001-150000 | MULTIPLE MPLS LABELS |

As illustrated in Table 1, the devices may allocate range 100000-110000, which represents an exemplary range, for MPLS packets carrying tunneled Ethernet payloads. Similarly, the devices allocate ranges of MPLS packets for carrying payloads of other types, such as Internet Protocol version 4 (IPv4), IPv6, and Asynchronous Transfer Mode (ATM) payloads. Based on the range of the MPLS label, the devices can extract a "key" from the payload that identifies the data flow of the payload carried by the MPLS packet. Using this key, the devices can readily distribute the MPLS packets across multiple paths, e.g., multiple physical links of an aggregated link.

The key extracted from the payload may include flow information, such as the source and destination IP address. The "granularity" of distribution of the MPLS packets across the paths, i.e., the extent to which MPLS packets of a common flow are distributed to a common interconnect, directly correlates with the amount of flow information included in the key. For example, application of a hashing function to a key that includes a source and destination address will result in a less granular distribution than application to a key that includes additional flow information, such as the protocol type, the source and destination port, the type of service (ToS), as well as any other information that remains constant for any one flow of data from source to destination. For payloads conforming to protocols such as ATM, the key may include information such as the ATM Virtual Channel Identifier (VCI), Virtual Path Identifier (VPI). In addition, the key may include the MPLS labels carrying the payloads, as well as other fields that may be encapsulated in an MPLS header.

In addition to defining ranges for various types of protocols, the devices may define a range of labels to indicate that the MPLS packet carries two or more MPLS labels. In Table 1 illustrated above, for example, the range 140001-150000 has been allocated for MPLS packets having multiple MPLS labels. As described in detail below, the devices may utilize the labels for distribution of the MPLS packets across multiple paths instead of extracting key data from the payloads. Because two or more MPLS labels can be used for the distribution, e.g., as inputs to a hash function, a reasonable balance of distribution may be achieved without relying on key data from the payload. This approach may be used by provider routers (not shown) within provider network 10 for internal traffic having multiple MPLS labels. This technique may offer the advantage of reduction in computing resources consumed by the distribution task, as the devices need not extract the key data from each packet.

In this manner, the devices of system 2 make use of the allocated ranges of MPLS labels to control the distribution of MPLS packets across multiple physical paths. Although the techniques have been described in reference to distribution of MPLS packets across parallel physical interconnects of an aggregated link, the techniques may be applied in a variety of environments. For example, the techniques may be readily applied to internal parallel data paths within a device. For example, the techniques may be used by a router to distribute packets across internal data paths that begin at the same input interface of the router and end at the same output interface of the router, but traverse through different internal, high-speed switch fabrics. A control unit for the router, for example, may implement the techniques to distribute received MPLS packets across multiple internal forwarding engines.

Figure 2A:
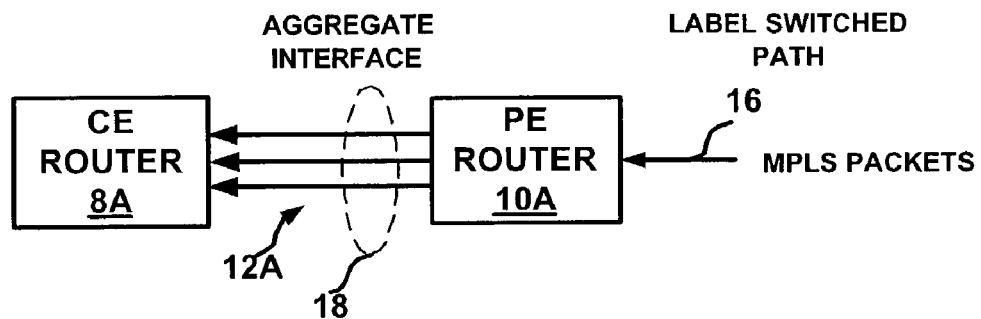
FIGS. 2A-2C are block diagrams illustrating portions of the system of FIG. 1 in further detail.
Figure 2B:
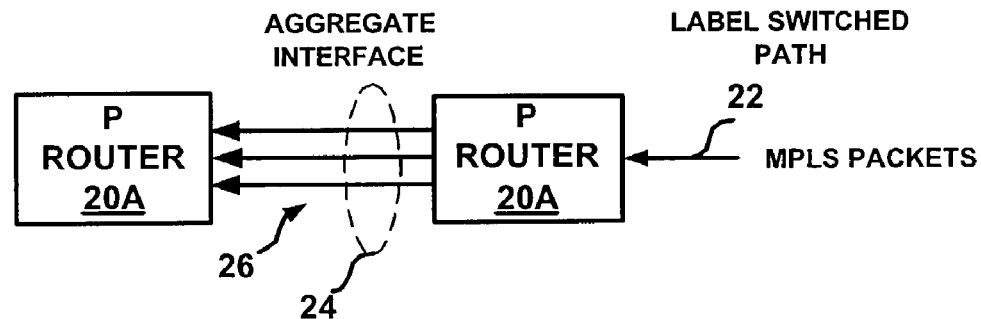
Figure 2C:
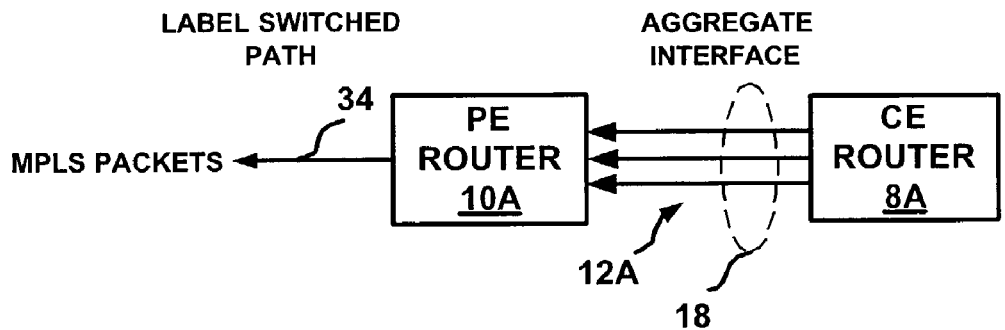

FIGS. 2A-2C are block diagrams illustrating example embodiments of portions of system 2 (FIG. 1). In particular, FIGS. 2A-2C illustrate various configurations in which devices of system 2 may distribute MPLS packets in accordance with the principles of the invention.

In FIG. 2A, PE router 10A receives inbound MPLS packets 16 from provider network 6, and distributes the inbound MPLS packets across physical interconnects 18 of aggregated link 12A. In FIG. 2B, intermediate provider (P) routers 20A, 20B within provider network 6 utilize the techniques to distribute transit MPLS packets 22 across physical interconnects 24 of aggregated link 26. In other words, aggregated link 26 represents an aggregated link within network 6.

In FIG. 2C, CE router 8A may distribute outbound MPLS packets across the multiple physical interconnects 18 of aggregated link 12A, for forwarding by PE router 10A as MPLS packets 34. In particular, CE router 8A receives packets from devices within customer network 4A, formulates MPLS packets by pre-pending MPLS labels based on the type of protocol of the received packets, and distributes the packets across aggregated link 12A.

Figure 3:
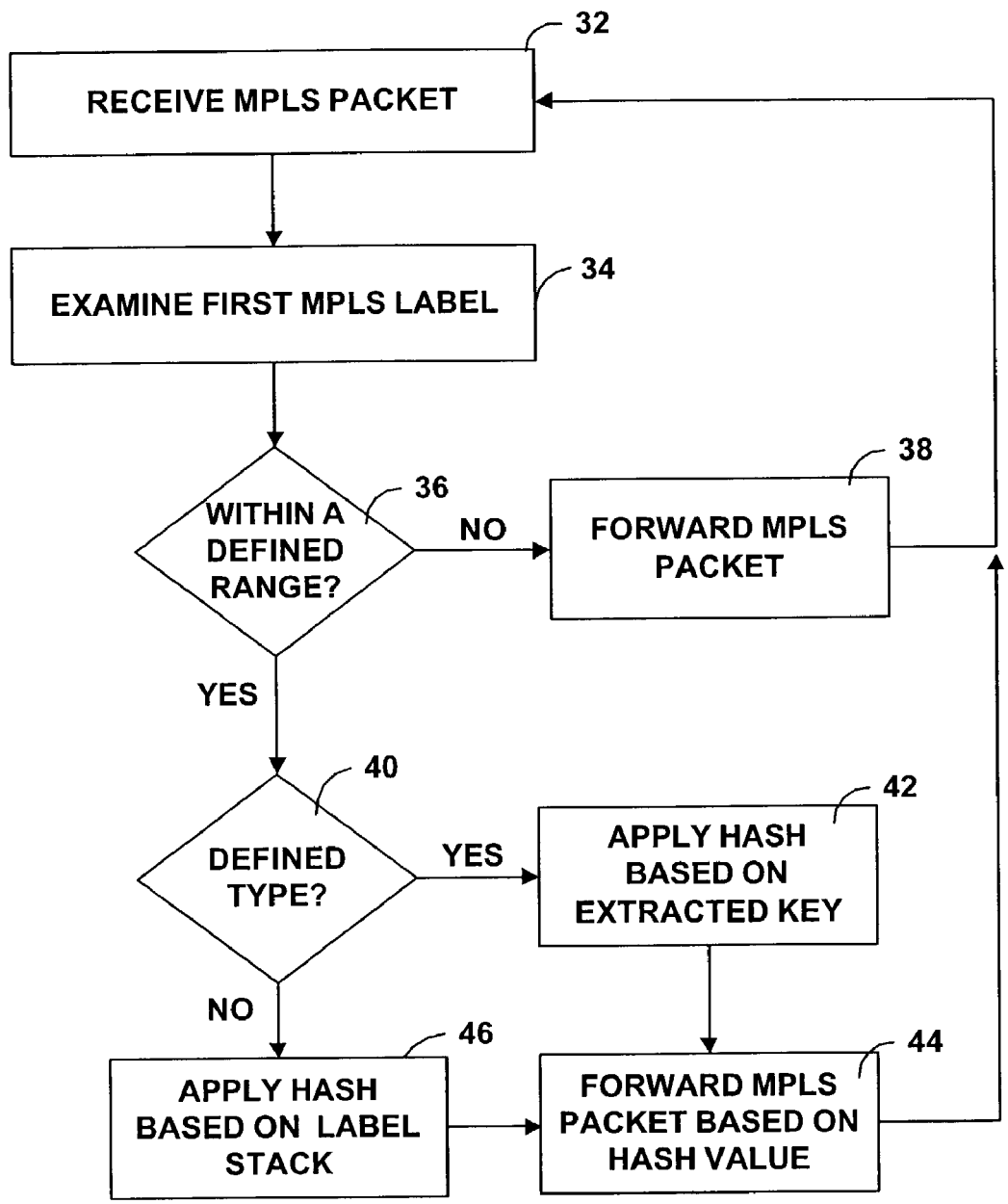
FIG. 3 is a flowchart illustrating example operation of a network device to distribute MPLS packets in accordance with the principles of the invention.

FIG. 3 is a flowchart illustrating operation of a network device for distribution of MPLS packets in accordance with the principles of the invention. In particular, the flowchart illustrates distribution of MPLS packets based on pre-allocated ranges of MPLS labels.

Initially, the network device receives an MPLS packet (32). For example, PE router 10A may receive an MPLS packet from provider network 6 destined for CE router 8A. The device examines the first MPLS label of the packet (34). The device determines whether the label falls within one of the pre-allocated ranges of labels (36). If the value for the label falls outside the defined ranges, the device forwards the MPLS packet across one of the available multiple paths (38) without regard to load balancing of the paths.

If the label falls within one of the defined ranges, the device performs additional processing based on the range within which the label falls. For example, if the range is mapped to a specific type of payload (40), then the device may apply a hash function using a key extracted from the payload of the MPLS packet based on the particular protocol type of the payload (42). The device then forwards the MPLS packet along one of the paths, e.g., one of the physical interconnects of an aggregated link based on the hash value (44).

If the label indicates that distribution should be applied based on multiple MPLS labels carried by the packet, the device may perform additional processing. For example, the device may apply a hash function to an MPLS label stack within the MPLS header of the packet (46), and forwards the MPLS packet based on the hash value (44).

Figure 4:
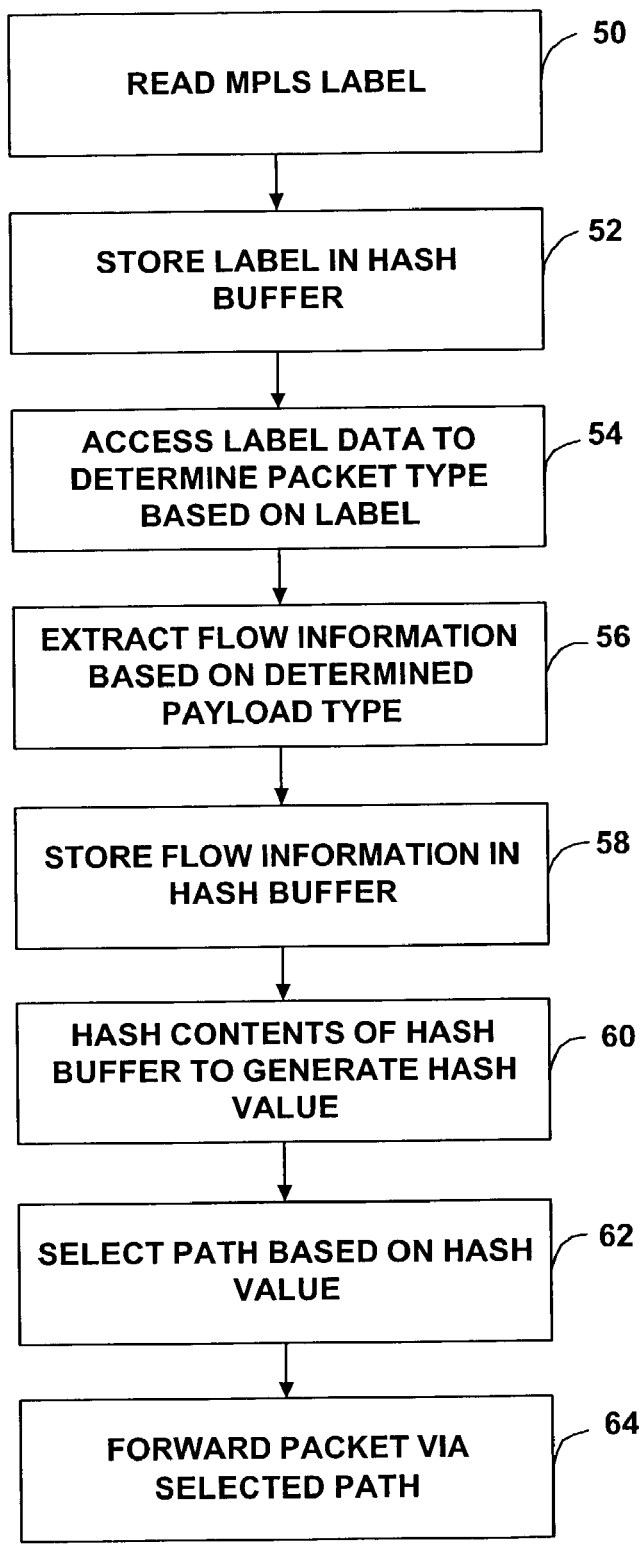
FIG. 4 is a flowchart illustrating the distribution of an MPLS packet based on a payload type as indicated by an MPLS label of the packet.

FIG. 4 is a flowchart illustrating the distribution of an MPLS packet based on a payload type, as indicated by an MPLS label of the packet. In particular, the device reads the MPLS label from the MPLS packet (50), and stores the label within a hash buffer (52). Next, the device accesses stored label data, such as the exemplary label data of Table 1, to determine the type of payload carried by the MPLS packet (54). In particular, the device may determine the protocol type of the carried payload.

Next, the device extracts flow information from the payload based on the protocol type, such as a payload conforming to IPv4, IPv6, Tunneled Ethernet, ATM, and other protocols (56). The device may develop a key based on the flow information. As described above, the key may contain source and destination addresses, source and destination ports, type of service (ToS), and other information specific to the data flow of the payload. The device stores the extracted key in the hash buffer (58).

After extracting the key, the device may generate a hash value by applying a hash function to the contents of the hash buffer, i.e., the key information as well as the stored MPLS label (60). After generating the hash value, the device selects one of the parallel paths, e.g., different physical interconnects of an aggregated link, based on the hash value (62). Finally, the device forwards the MPLS packet along the selected path (64). In this manner, the techniques may generate hash values having substantial distribution for different data flows associated with a common LSP, and for data flows associated with different LSPs. In addition, because MPLS packets of a common data flow have identical MPLS labels and keys, the hashing function will generate identical hash values for the MPLS packets, thereby maintaining the sequence of the MPLS packets.

Figure 5:
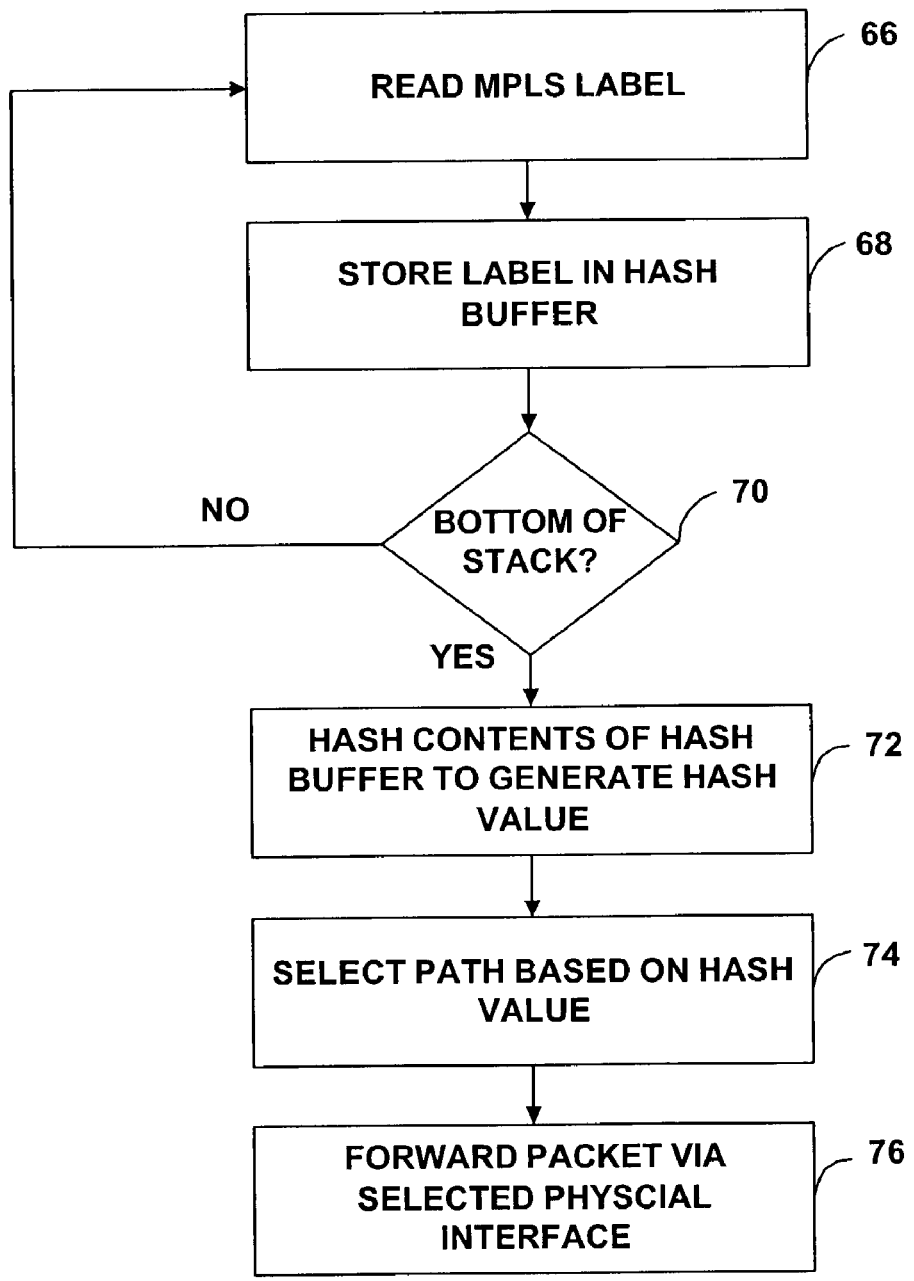
FIG. 5 is a flowchart illustrating the distribution of an MPLS packet based on a plurality of MPLS labels carried by the packets.

FIG. 5 is a flowchart illustrating the distribution of an MPLS packet based on a plurality of MPLS labels carried by the packets. For example, a device may apply the techniques for distribution of an MPLS packet carrying a first MPLS label within a range that indicates multiple MPLS labels are present, e.g., 140001-150000 of the exemplary label data of Table 1.

Initially, the device reads the first MPLS label from the MPLS packet (66), and stores the label within an internal hash buffer (68). Next, the device determines whether all of the MPLS labels have been retrieved from the header of the MPLS packet, i.e., whether a bottom of a "stack" of MPLS labels has been reached (70).

In particular, each MPLS label includes a bottom-of-stack (BOS) bit that indicates whether the particular label is the last label within the header. If the label is not the last label, the device extracts the next label (66), and stores the label in the internal hash buffer (70). The device repeats this process until all of the labels have been read from the MPLS packet and stored in the buffer, i.e., until the BOS bit indicates that the bottom of the label stack has been reached.

Next, the device may generate a hash value by applying a hash function to the contents of the hash buffer, i.e., the plurality of stored labels (72). Because multiple labels are used as inputs to the hash function, the device may generate hash values of substantial distribution using only the MPLS labels, i.e., with out regard for to the payload of the packet. Furthermore, because MPLS packets of a common data flow will have identical labels, the techniques maintain the sequence of MPLS packets belonging to a common data flow.

After generating the hash value, the device selects one of the parallel paths, e.g., different physical interconnects of an aggregated link, based on the hash value (74). Finally, the device forwards the MPLS packet along the selected path (76).

Figure 6:
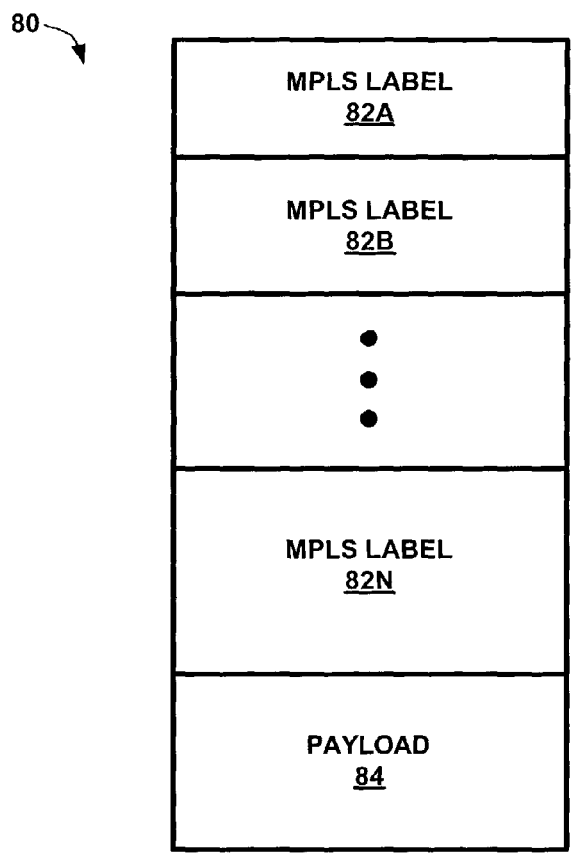
FIG. 6 is a block diagram illustrating an example MPLS packet having multiple MPLS labels.

FIG. 6 is a block diagram illustrating an example MPLS packet 80 having multiple MPLS labels 82A-82N. In other words, MPLS labels 82 form a label stack, of which MPLS label 82N is the bottom label. In addition, MPLS packet 80 includes a payload 84 that contains other information, such as a communication data unit in the form of a packet, cell, frame, or the like. For example, payload 84 may carry a tunneled Ethernet frame, an IPv4 or IPv6 packet, an ATM cell, or the like.

As described, a device may selectively apply a hashing function to MPLS packet 80 based on a pre-defined range of labels within which MPLS label 82A falls. For example, the device may apply a hashing function that utilizes as inputs multiple MPLS labels 82. As an alternative, a device may use one or more fields directly from one or more of MPLS labels 82 instead of using a hashing function. As yet another example, the device may apply a hashing function that utilizes as inputs one or more of MPLS labels 82, and a key of flow information extracted from payload 84.

Figure 7:
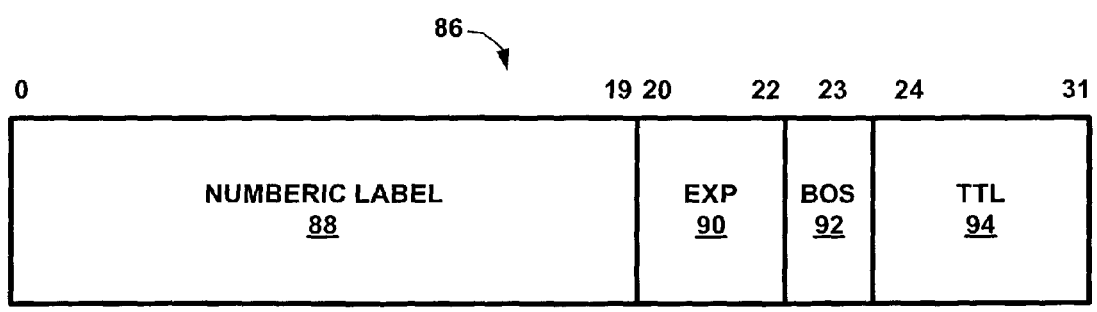
FIG. 7 is a block diagram illustrating an example MPLS label.

FIG. 7 is a block diagram illustrating an example MPLS label 86. As illustrated, MPLS label 86 includes a 20-bit numeric label 88. In addition, MPLS label 86 includes 3 EXP bits 90 that may identify a service associated with MPLS label 86. MPLS label 86 further includes a single bottom-of-stack (BOS) bit 92 that indicates whether the label is the last label within the label stack of the respective packet. Finally, MPLS label 86 includes an 8-bit time-to-live value (TTL) 94. When using MPLS label 86 as an input to a hash function, a device may utilize combinations of these fields, such as a portion or all of numeric label 88 and EXP bits 90.

Figure 8:
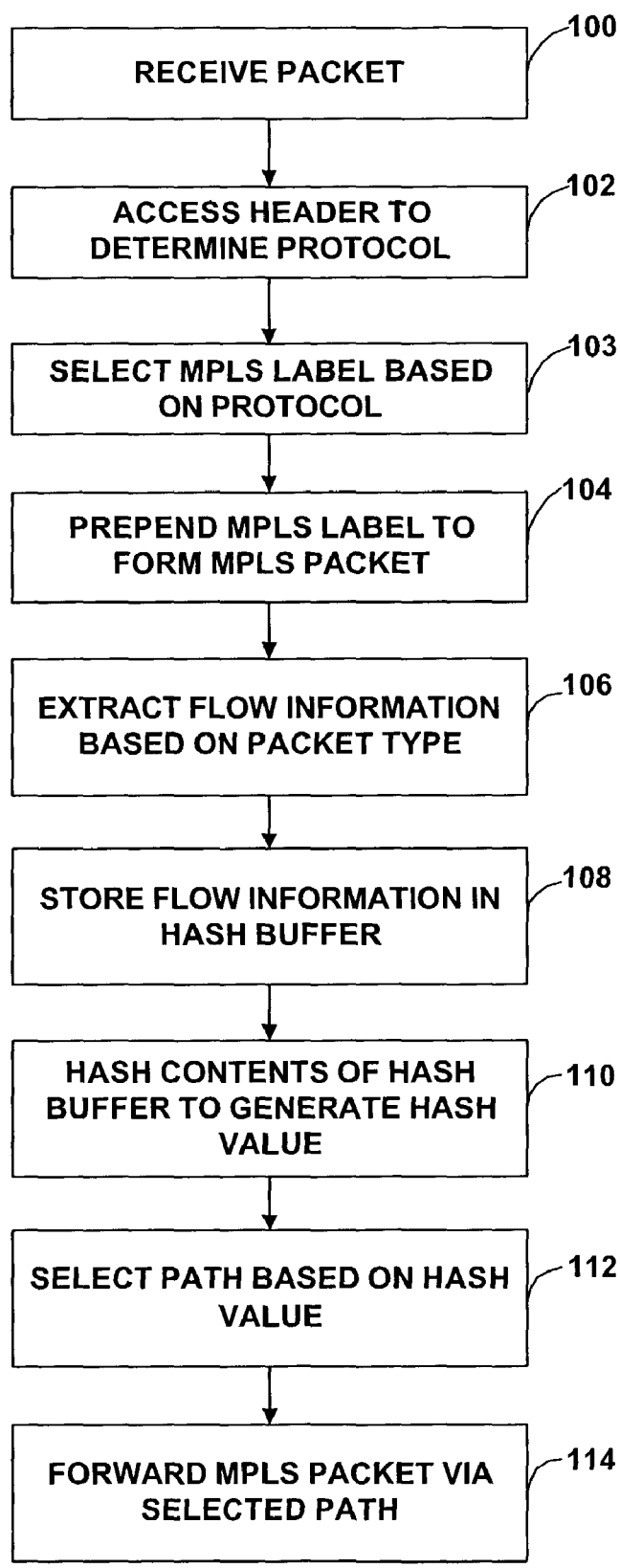
FIG. 8 is a flowchart illustrating example formulation of an MPLS packet in accordance with the principles of the invention.

FIG. 8 is a flowchart illustrating example operation of an LSP-enabled router, such as CE router 8A of FIG. 1, when formulating MPLS packets and distributing the packets across multiple paths in accordance with the principles of the invention. Initially, the router receives a non-MPLS packet from a local device (100). For example, CE router 8A may receive a packet from a device within customer network 4A.

Next, the device accesses the packet header to determine the communication protocol for the packet, e.g., IPv4, IPv6, ATM, or the like (102). Based on the type of protocol, the device selects an appropriate MPLS label within one of the defined ranges (103), and pre-pends the label to the packet to form an MPLS packet (104).

In addition, the device extracts flow information, i.e., a key, from the payload based on the protocol type (106), and stores the extracted key in the hash buffer (108). The device generates a hash value by applying a hash function to the contents of the hash buffer, i.e., the flow information (110). After generating the hash value, the device selects one of the parallel paths, e.g., different physical interconnects of an aggregated link, based on the hash value (112).

Finally, the device forwards the MPLS packet along the selected path (114). In this manner, a router, such as CE router 8A, may generate MPLS packets at an egress for an LSP that carry labels in accordance with pre-allocated ranges. Other devices, such as PE routers 10, may make use of the labels to distribute the MPLS packets across parallel paths.

Figure 9:
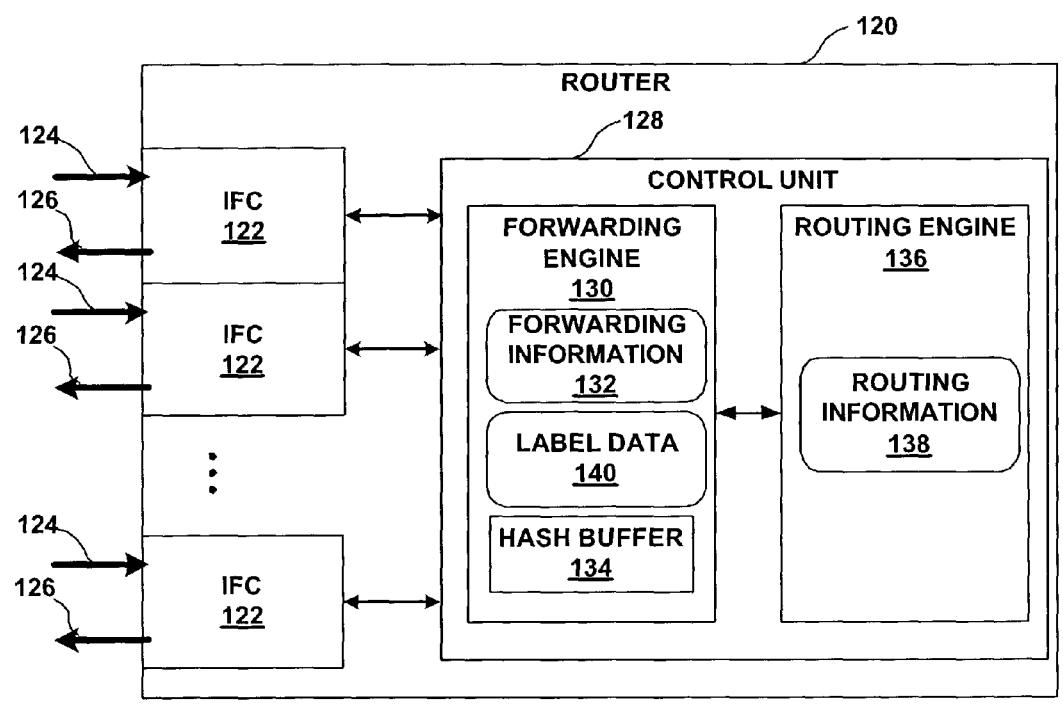
FIG. 9 is a block diagram illustrating an exemplary router that distributes MPLS traffic across parallel data paths in accordance with the principles of the invention.

FIG. 9 is a block diagram illustrating an exemplary router 120 that distributes MPLS packets across parallel physical paths in accordance with the principles of the invention. Although the techniques are illustrated in reference to a router, the techniques may be readily applied to other network devices, such as switches, hubs, firewalls, gateways, proxy servers, and the like. In addition, the techniques may be applied to "edge" devices that provide access to a large network, such as the Internet, or to high-speed "core" devices within the network.

Router 120 includes a control unit 128 that directs inbound packets received from inbound links 124 to appropriate outbound links 126. In particular, the functionality of control unit 128 can be divided between a routing engine 136 and a packet-forwarding engine 130.

Routing engine 136 is primarily responsible for maintaining routing information 138 to reflect the current network topology. In order to maintain an accurate representation of the network, router 120 supports a number of protocols for exchanging routing information with other routers. For example, router 120 may support the Border Gateway Protocol (BGP), for exchanging routing information with routers of other autonomous systems. Similarly, router 120 may support the Intermediate System to Intermediate System protocol (IS-IS), which is an interior gateway routing protocol for communicating link-state information within an autonomous system. Other examples of interior routing protocols include the Open Shortest Path First (OSPF), and the Routing Information Protocol (RIP).

Routing engine 136 directs packet-forwarding engine 130 to maintain forwarding information 132 in accordance with routing information 138. Forwarding information 132 may, therefore, be thought of as derived from the information contained within routing information 138. In particular, forwarding information 132 associates packet information, e.g., a "key" as described above, with specific forwarding next hops (FNH). A FNH generally refers to a neighboring router physically coupled to router 120 along a given route. For example, the FNH for a route may specify a physical interface and media access control (MAC) address for the interface associated with the neighboring router.

Packet-forwarding engine 130 controls the flow of packets through router 120, and distributes MPLS traffic across parallel paths, as described herein. In particular, router 120 includes a plurality of interface cards (IFCs) 122 for sending and receiving packets via inbound links 124 and outbound links 126. IFCs 122 may include a number of interface ports (not shown) for coupling to network links 124 and 126.

Specifically, upon receiving an inbound packet via an input port of one of IFCs 122, packet-forwarding engine 130 selects an appropriate FNH for the packet based on forwarding information 132. Packet forwarding engine 130 maps the selected FNH to an output interface for IFCs 122, and relays the packet to the selected output interface for transmission.

For MPLS packets, packet-forwarding engine 130 distributes the MPLS packets in accordance with the techniques described herein. For example, for MPLS packets destined for an aggregated link, packet-forwarding engine 130 distributes the packets across the output interfaces associated with the multiple physical interconnects of the aggregated link. In particular, packet-forwarding engine 130 makes use of label data 140 to control distribution of the MPLS packets. For example, label data 140 may map a label of the inbound MPLS packet to a protocol type, or may designate the MPLS packet as having multiple labels, as illustrated in Table 1 above.

Packet-forwarding engine 130 includes hash buffer 124 to store an extracted key and one or more MPLS labels of the packet. Packet-forwarding engine 130 applies a hash function to the contents of hash buffer 134 to generate a hash value. Based on the generated hash value, packet-forwarding engine 130 relays the MPLS packet to one of the physical interfaces of IFCs 22 for transmission.

Packet-forwarding engine 130 may arrange label data 140 in the form of a variety of data structures, such as a number of tables, link lists, radix trees, databases, flat files, or other data structures. Furthermore, packet-forwarding engine 130 may store the data structures on one or more computer-readable media, such as a magnetic medium, optical medium, non-volatile random access memory (NVRAM), dynamic random access memory (DRAM), FLASH memory, or the like.

Each of packet-forwarding engine 130 and routing engine 136 may comprise one or more dedicated processors, discrete hardware circuitry, and the like, and may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. Furthermore, although the functionality has been described in reference to a central control unit of a network device, e.g., control unit 128 of router 120, the functionality may be distributed within the network device, e.g., within IFCs 122.

A number of embodiments of the present invention have been described. Furthermore, the techniques may be applied in a variety of environments. For example, the techniques may be used to distribute label switched packets across physical interconnects of an aggregated link, as described. In addition, the techniques may be readily applied to internal parallel data paths within a device, such as data paths that begin at the same input interface of a router and end at the same output interface of the router, but traverse through different interconnects. For example, a control unit for a router may implement the techniques to distribute received packets across multiple internal forwarding engines. Nevertheless, it will be understood that various modifications may be made without departing from the spirit and scope of the invention. Accordingly, other embodiments are within the scope of the following claims.

The invention claimed is:

1. A method comprising:
   receiving packets associated with a common label switched path (LSP);
   reading a first label of each packet;
   accessing label data that associates ranges of labels with different types of communication protocols, wherein the label data includes at least one predefined range defining that a packet is a multi-label packet having a plurality of labels;
   determining whether each of the packets has multiple labels when the first label is within the predefined range; and
   distributing the packets across multiple paths based on the determination.

2. The method of claim 1, wherein for those packets having a single label, distributing the packets comprises:
   reading the label of each of the packets;
   determining payload types for the packets based on the label associated with each packet; and
   distributing the packets based on the payload types for the packets.

3. The method of claim 2, further comprising:
   extracting flow information from the packets based on the determined payload types for the packets;
   generating hash values from the flow information of the packets; and
   distributing the packets across the multiple paths based on the hash values.

4. The method of claim 1, wherein for those packets in which the first label of the packet is within the predetermined range, distributing the packets comprises:
   reading multiple labels from each of the packets;

generating a hash value for each of the packets based on the multiple labels of the respective packet; and distributing the packets across the multiple paths based on the hash values.

5. The method of claim 1, wherein for any number of labels in each of the packets, distributing the packets comprises distributing the packets across multiple physical interconnects of an aggregated network link.

6. The method of claim 1, wherein, for an number of labels in each of the packets, distributing the packets comprises distributing the packets across multiple internal data paths of a network device.

7. The method of claim 1, wherein the packets comprise multiprotocol label switched (MPLS) packets.

8. A method comprising:
receiving a packet having a label in accordance with a label switching protocol;
reading the first label of the packet;
accessing label data that associates ranges of labels with different types of communication protocols, wherein the label data includes at least one predefined range defining that a packet is a multi-label packet having a plurality of labels;
determining that the packet has multiple labels when the first label is within the predefined range;
when the packet has a single label, extracting flow information from a payload of the packet based on the label and distributing the packet to one of a plurality of paths based on the extracted flow information; and
when the first label is within the predetermined range, distributing the packet to one of a plurality of paths based on the multiple labels without regard to the payload of the packet.

9. The method of claim 8, wherein when the packet has a single label, further comprising:
determining a payload type of the packet based on the label;
extracting the flow information from the packet based on the determined payload type;
generating a hash value from the flow information; and
distributing the packet to one of a plurality of paths based on the hash value.

10. The method of claim 9, wherein determining a payload type comprises:
accessing label data that associates ranges of labels with different types of payloads; and
identifying one of the ranges for the label of the packet.

11. The method of claim 9, wherein generating a hash value comprises applying a hash function to at least a portion of the flow information and the label.

12. The method of claim 9, wherein distributing the packet comprises distributing the packet across one of a physical interconnect of an aggregated network link, a path within a network, and an internal data path of a network device.

13. The method of claim 8, wherein the packet comprises a multiprotocol label switched (MPLS) packet.

14. The method of claim 8, wherein, for each of the packets, when the first label is within the predetermined range, distributing the packet comprises:
applying a hash function to the multiple labels to generate a hash value; and
distributing the packet based on the hash value.

15. The method of claim 14, wherein distributing the packet comprises:
selecting one of a plurality of physical interconnects of an aggregated network link based on the hash value; and
forwarding the label switched packet along the selected physical interconnect.

16. The method of claim 14, wherein distributing the packet comprises:
selecting one of a plurality of parallel data paths within a network device based on the hash value; and
relaying the label switched packet within the network device along the selected data path.

17. The method of claim 14, wherein distributing the packet comprises:
selecting one of a plurality of packet-forwarding engines within a router based on the hash value; and
forwarding the label switched packet along a route within the network using the selected packet-forwarding engine.

18. The method of claim 8, wherein the packet comprises a multiprotocol label switched (MPLS) packet.

19. A method comprising:
receiving a data unit from a network device;
determining a type of communication protocol for the data unit;
accessing label data that associates ranges of labels with different types of communication protocols, wherein the label data includes at least one predefined range to indicate that a data unit has a plurality of labels;
selecting a label based on the type of communication protocol and whether the data unit has multiple labels;
pre-pending the selected label to the data unit to form a label switched packet in accordance with a label switching protocol; and
forwarding the packet along a label switched path in accordance with the label.

20. The method of claim 19, wherein selecting a label comprises:
identifying one of the ranges based on the communication protocol of the data unit and whether the data unit has multiple labels; and
selecting a label within the identified range.

21. The method of claim 19, wherein receiving the data unit comprises receiving a packet conforming to the Internet Protocol.

22. The method of claim 19, wherein receiving the data unit comprises receiving a cell conforming to the Asynchronous Transfer Mode protocol.

23. The method of claim 19, wherein receiving the data unit comprises receiving a tunneled Ethernet frame.

24. The method of claim 19, further comprising:
extracting flow information from the data unit based on the determined communication protocol;
generating a hash value from the flow information; and
distributing the label switched packet to one of a plurality of paths based on the hash value.

25. The method of claim 24, wherein distributing the label switched packet comprises distributing the label switched packet across one of a physical interconnect of an aggregated network link and an internal data path of a network device.

26. The method of claim 19, wherein the label switched packet comprises a multiprotocol label switched (MPLS) packet.

27. A network device comprising:
a computer-readable medium storing label data that associates ranges of labels with different types of communication protocols, wherein the label data includes at least one predefined range defining that a packet is a multi-label packet having a plurality of labels;

an interface card to receive packets associated with a common label switched path (LSP); and a control unit to distribute the packets across multiple paths, wherein the control unit reads a first label of each of the packets and determines whether each of the packets has multiple labels when the first label is within the predefined range.

28. The network device of claim 27, further comprising label data that maps ranges of labels to payload types, wherein for those packets having a single label, the control unit distributes the packets based on the payload types of the packets in accordance with the label data.

29. The network device of claim 28, wherein for those packets having a single label, the control unit extracts flow information from the packets based on the determined payload types for the packets, and distributes the packets across the multiple paths based on the flow information.

30. The network device of claim 29, wherein for those packets having a singe label, the control unit generates hash values from the flow information of the packets, and distributes the packets across the multiple paths based on the hash values.

31. The network device of claim 27, wherein for those packets having multiple labels, the control unit reads the multiple labels from each of the packets, generates a hash value for each of the packets based on the multiple labels of the respective packet, and distributes the packets across the multiple paths based on the hash values.

32. The network device of claim 27, further comprising an interface card to receive multiple physical interconnects of an aggregated network link, wherein the control unit distributes the packets across the multiple physical interconnects.

33. The network device of claim 27, wherein the control unit distributes the packets across multiple internal data paths of the network device.

34. The network device of claim 27, wherein the packets comprise multiprotocol label switched (MPLS) packets.

35. A computer-readable storage medium comprising instructions that cause a processor to:

receive packets associated with a common label switched path (LSP);

access label data that associates ranges of labels with different types of communication protocols, wherein the label data includes at least one predefined range defining that a packet is a multi-label packet having a plurality of labels;

read a first label of each packet;

determine that a packet has multiple labels when the first label is within the predefined range; and distribute the packets across multiple paths.

36. The computer-readable medium of claim 35, further comprising, for those packets having a single label instructions to cause a processor to:

read the label of each of the packets;

determine payload types for the packets based on the label associated with each packet; and distribute the packets based on the payload types for the packets.

37. The computer-readable medium of claim 36, further comprising, for those packets having a single label, instructions to cause a processor to:

extract flow information from the packets based on the determined payload types for the packets;

generate hash values from the flow information of the packets; and distribute the packets across the multiple paths based on the hash values.

38. The computer-readable medium of claim 35, further comprising, for those packets having multiple labels, instructions to cause a processor to:

read multiple labels from each of the packets;

generate a hash value for each of the packets based on the multiple labels of the respective packet; and distribute the packets across the multiple paths based on the hash values.

39. The computer-readable medium of claim 35, further comprising instructions to cause a processor to distribute the packets across one of a physical interconnect of an aggregated network link, a path within a network, and an internal data path of a network device.

40. The computer-readable medium of claim 35, wherein the packets comprise multiprotocol label switched (MPLS) packets.

41. A computer-readable storage medium comprising label data that associate ranges of labels with types of payloads of label switched packets, wherein the data defines a first label range to indicates that a label switched packet include a plurality of labels, and wherein the first label range directs a router to control distribution of the label switched packets across multiple physical data paths by application of a hash function to the multiple labels without regard of the payloads of the label switched packets.

42. The computer-readable medium of claim 41, wherein the label data associates respective ranges of the labels with payloads conforming to the Internet Protocol version 4 (IPv4), the Internet Protocol version 6 (IPv6), the Asynchronous Transfer Mode (ATM), and tunneled Ethernet.

43. The computer-readable medium of claim 41, wherein the label data defines a respective range of labels for packets carrying more than one label.

44. The computer-readable medium of claim 41, wherein the packets comprise multiprotocol label switched (MPLS) packets.

* * * * *

UNITED STATES PATENT AND TRADEMARK OFFICE
CERTIFICATE OF CORRECTION

PATENT NO. : 7,277,386 B1  Page 1 of 1
APPLICATION NO. : 10/293785
DATED : October 2, 2007
INVENTOR(S) : Dennis C. Ferguson et al.

It is certified that error appears in the above-identified patent and that said Letters Patent is hereby corrected as shown below:

Column 11, line 9 (claim 6), "an" should read --any--.

Signed and Sealed this

Nineteenth Day of August, 2008

JON W. DUDAS
*Director of the United States Patent and Trademark Office*